United States Patent
Sachindra et al.

(10) Patent No.: US 7,255,889 B2
(45) Date of Patent: Aug. 14, 2007

(54) CHICKEN SOUP MIX COMPOSITION AND A PROCESS FOR PREPARING THE SAME

(75) Inventors: Nakkarike Manja Bhatta Sachindra, Karnataka (IN); Patiram Zituzi Sakhare, Karnataka (IN); Puttaswamiah Puttarajappa, Karnataka (IN); Dittakavi Narasimha Rao, Karnataka (IN)

(73) Assignee: Council of Scientific and Industrial Research, New Delhi (IN)

( * ) Notice: Subject to any disclaimer, the term of this patent is extended or adjusted under 35 U.S.C. 154(b) by 334 days.

(21) Appl. No.: 10/393,391

(22) Filed: Mar. 21, 2003

(65) Prior Publication Data
US 2004/0185165 A1 Sep. 23, 2004

(51) Int. Cl.
*A23L 1/0522* (2006.01)
*A23L 1/315* (2006.01)

(52) U.S. Cl. ...................... 426/589; 426/661
(58) Field of Classification Search ................ 426/589, 426/661
See application file for complete search history.

(56) References Cited

U.S. PATENT DOCUMENTS 3,987,207 A * 10/1976 Spaeti et al. .................. 426/99
5,232,732 A    8/1993 Harris et al.

FOREIGN PATENT DOCUMENTS

GB    2007489    5/1979
JP    2002045154    2/2002

* cited by examiner

*Primary Examiner*—Helen Pratt
(74) *Attorney, Agent, or Firm*—Dinesh Agarwal, P.C.

(57) ABSTRACT

Preparation of dehydrated chicken soup mix involves pressure cooking of chicken meat along with ginger, garlic and onion, separation of liquid extract from cooked meat, separation of meat from the bone, blending of cooked meat and extract with starch and spices into a mix, addition of liquid extract to the mix to make it a slurry, drying of slurry into powder form, and mixing of this powder with milk powder, salt, monosodium glutamate (MSG), ascorbic acid, pepper powder and sugar and packed. The product is sensorily highly acceptable and is microbiologically safe.

15 Claims, 1 Drawing Sheet

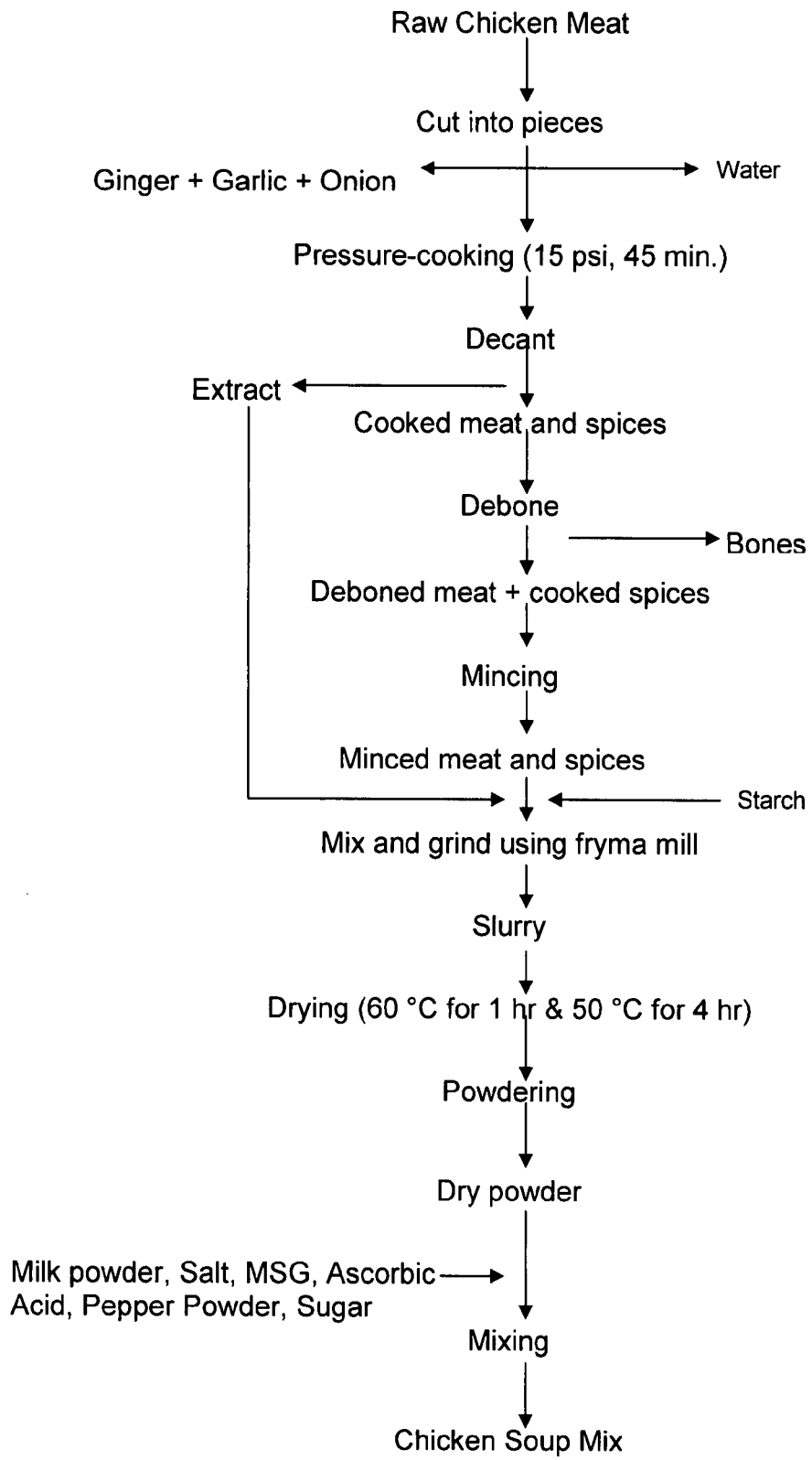

CHICKEN SOUP MIX COMPOSITION AND A PROCESS FOR PREPARING THE SAME

FIELD OF THE INVENTION

The present invention relates to an improved chicken soup mix composition and a process for preparing the same.

BACKGROUND OF THE INVENTION

Poultry industry is one of the important food industries in India, providing eggs and chicken meat to the consumers in Indian market. It occupies fourth place in the world in egg production, producing around 36,000 million eggs annually from layer chicken. Layer chicken population is around 140 million. Meat from layer chicken after egg laying period is completed is tough and under-utilized. Value addition and effective utility of this meat can be enhanced by processing the meat into ready-to-use convenient products such as chicken soup mixes. These types of products are becoming more popular in India and abroad in the consumer market. Globalization of Indian industry has further opened global markets for the chicken-based products. Hence, there is a growing demand for products like chicken soup mix (dehydrated) world over. To meet these demands, effective utilization of under-utilized layer chicken would not only provide value added products but also supply protein-rich nutrients to the consumers. Further, soup would stimulate the appetite and flow of digestive juices in stomach and normally they are consumed before meal. There is a limited information on the preparation of chicken soup mix in dehydrated form chicken meat. The objective is to develop an improved process for the preparation of chicken soup mix in dehydrated form from layer chicken meat.

Reference may be made to patent number GB 2007489 dated 23rd May 1979 by Toyo Suisan Kaisha (Instantly cookable dry soup mix) wherein an instantly cookable dry soup mix was prepared from a mixture of powdered dried stock which contained several dried ingredients. The main drawback is that the preparation involved only mixing of dry ingredients, which will give poor body to the prepared soup due to lack of binding between starch and meat solids.

Reference may be made to patent number CN 1107670 dated 6th Sep. 1995 by Botao Liu, C.N. and Yumin Yong C.N. (processing method for convenient beef or mutton soup blend and its soaked, steamed bread (paomao)) wherein the instant beef or mutton soup blend was made up through such steps as boiling fresh beef or mutton to half-cooked, slicing, boiling, flavouring in the beef or mutton soup concentration mixing with starch, white sugar, plant oil, buffer and refined edible salt. The main drawback is that the extract from beef or mutton instead of whole meat was used for making soup mix and the process involved concentration, which is a high energy consuming process.

Reference may be made to patent number CN1293013 dated 2nd May 2001 by Li Deping, CN., Zhang Anhui, CN and Yang Yuiki (canned chicken soup) wherein a canned chicken soup was prepared from killed and cleaned fresh hen chicken, water, Chinese medical stone, refined, salt, flavouring etc. through steaming and canning the soup. The main drawbacks are that the product is not in dehydrated form and use of canning which is an expensive technology.

Reference may be made to Japanese patent number JP2002045154 dated 12th Feb. 2002 by Hayashi Hiroyuki (chicken soup stock and method for producing the same) wherein chicken soup mix was prepared by adding water to the chicken meat, heating the mixture, keeping the mixture at a temperature not boiling water to condense the mixture, filtering the condensed chicken extract, and then condensing the obtained filtrate by the use of a vacuum condensation machine. The main drawback is that chicken extract was used for making soup and the process involved energy consuming vacuum condensation technique.

Reference may be made to patent number U.S. Pat. No. 5,232,732 by Harris N E and Davis B A dated Aug. 3, 1993 (Dry soup mix), wherein in dry soup mix is prepared by mixing dry edible components such as starch, dried chicken solids, hydrolysed chicken protein and spice powders. The main drawbacks are the process involved use of hydrolysed chicken protein and mere mixing of dry ingredients will results in poor body of the prepared soup due to improper binding between starch and meat solids.

OBJECTS OF THE INVENTION

The main objective of the present invention is to provide an improved chicken soup mix and a process for the preparation of the chicken soup mix composition which obviate the drawbacks as mentioned above.

Another objective is to develop chicken soup mix in dehydrated form.

Yet another objective is to improve the body of the prepared chicken soup.

Yet another objective is to develop chicken soup mix rich in protein.

SUMMARY OF THE INVENTION

Accordingly, the present invention relates to a chicken soup mix composition, said composition comprising 72.0-76.0% by weight of cooked chicken meat, 8.0-12.0% by weight of starch and the remaining being food grade additives, flavoring agents and preservatives.

The novelty of the present invention is also in mixing and grinding of cooked chicken meat with starch during the preparation of soup mix, which will improve the binding of starch with meat solids, thus improving the body of the prepared soup.

BRIEF DESCRIPTION OF THE DRAWING

The Figure broadly illustrates a flow diagram of the process of the present invention.

DETAILED DESCRIPTION OF THE INVENTION

Accordingly, the present invention provides a chicken soup mix composition, said composition comprises:

| | |
|---|---|
| Chicken | 72.0–76.0% by weight |
| Starch | 8.0–12.0% by weight |
| Ginger | 1.75–2.0% by weight |
| Garlic | 1.75–2.0% by weight |
| Onion | 3.0–6.0% by weight |
| Milk powder | 3.0–5.0% by weight |
| Salt | 3.0–4.0% by weight |
| MSG | 0.02–0.05% by weight |
| Ascorbic acid | 0.15–0.25% by weight |
| White pepper powder | 0.30–0.40% by weight |
| Sugar | 0.10–0.70% by weight |

The present invention relates to an improved process for the preparation of ready to use chicken soup mix, said process comprising the steps of:

(i) Obtaining 72.0-76.0% by weight of chicken pieces with bone;
(ii) cooking the chicken pieces of step (i) along with 1.75-2.0% by weight of chopped ginger, 1.75 to 2.0% by weight of garlic and 3.0-6.0% by weight of onion in water for a time period in the range of 30-45 min;
(iii) separating and collecting the extract from the cooked mass;
(iv) removing the bones from cooked mass to obtain a meat mixture containing deboned meat, cooked ginger, garlic and onion;
(v) mincing the meat mixture of step (iv);
(vi) adding the extract obtained in step (iii) and 8.0-11.0% by weight of starch to the minced meat mixture of step (v) and mixing them to obtain a slurry;
(vii) grinding the slurry of step (vi);
(viii) drying the ground slurry of step (vii) to obtain a dried mass;
(ix) powdering the dried mass of step (viii) and mixing the same with 3.0-5.0% by weight of milk powder, 3.0-4.0% by weight of salt, 0.02-0.05% by weight of MSG, 0.15-0.25% by weight of ascorbic acid, 0.30-0.40% by weight of pepper powder and 0.20-0.50% by weight of sugar to get the soup mix.

In an embodiment of the present invention, hygienically processed dressed layer chicken is cut into pieces and cooked in water along with chopped ginger, garlic and onion.

In a further embodiment, the flavoring agents are ginger, garlic, salt, sugar, pepper and chicken masala (spice mix).

In another embodiment, the food grade additives are milk powder and onion and the preservatives are monosodium glutamate (MSG) and ascorbic acid In yet another embodiment, the chicken used is a dressed chicken.

In a still further embodiment, the dressed chicken is cut into 10-12 pieces per bird.

In another embodiment of the invention, 8-10 ltrs of water is used for cooking and the cooking is done at 15 psi and the extract is separated from the cooked mass by draining and mincing is done manually or by using a mincing means.

In another embodiment, the starch used is corn starch.

In a further embodiment, the mixing is done manually or using a mixing means and the grinding is carried out by passing the slurry through a fryma mill for one or more times.

In yet another embodiment, the grinding is carried out by passing the slurry through a fryma mill for 2-3 times and the slurry is dried in a tray drier.

In a further embodiment, the slurry is dried at 50-60° C. for a 4-5 hours and the dried mass is powdered using a pulverizer.

In another embodiment, the mixing is done manually or using a mixer.

EXAMPLE 1

One-and-a-half kilogram of whole dressed chicken with bone was cut into 12 pieces and (b) cooked at 15 psi for 45 min in 1.5 ltr water along with 37.5 gms of chopped ginger, 37.6 gms of chopped garlic and 90 gms of chopped onion. (c) The extract was separated from the cooked mix and collected and the meat was separated from the cooked chicken and deboned meat along with cooked ginger, garlic and onion was minced. (d) The minced meat was mixed with the collected extract and 112.5 gms of corn starch was added and made it a slurry and the slurry was passed twice through fryma mill. (e) The slurry was dried using a tray drier at a temperature of 60° C. for the initial one hour and then at 50° C. for 4 hours. (f) The dried material was powdered using a pulveriser and mixed with 75 gms of milk powder, 63.5 gms of salt, 7.5 gms of MSG, 4.25 gms of ascorbic acid, 7.5 gms of pepper powder and 7.5 gms of sugar. (g) The dehydrated soup mix was analyzed for proximate composition, salt and microbial level. (h) Soup was prepared from dehydrated mix by mixing 10 gms of soup mix in 100 ml water and boiling for 2 min and sensorily evaluated by a 9-point hedonic scale. The results of the experiments are presented in Table 1. The yield of soup mix was 45.7%. The product consisted of 42.95% protein and 27.3% fat. Microbial profile (per gram except coliforms) was as follows: Total plate count $5.45 \times 10^4$, spore count $8.4 \times 10^3$, yeast and mould count $1.1 \times 10^2$ and coliforms (MPN/g) 3.8. Microbial counts were within the standard limits. Sensory profile revealed that the product was found to be acceptable.

TABLE 1

Yield, proximate composition, salt content, microbial and sensory profiles of dry soup mix

|  | % |
| --- | --- |
| Yield | 45.7 |
| Moisture | 5.3 |
| Protein | 42.03 |
| Fat | 27.3 |
| Ash | 13.5 |
| Salt | 9.7 |

| Microbial load (count/g) |  |
| --- | --- |
| Total plate count | $5.45 \times 10^4$ |
| Spore count | $8.4 \times 10^3$ |
| S. aureus | Nil |
| Yeast and mould count | $1.1 \times 10^2$ |
| Coliforms (MPN/g) | 3.8 |

| Sensory profile Score |  |
| --- | --- |
| Color | 7.6 |
| Consistency | 7.8 |
| Flavour | 8.0 |
| Taste | 8.0 |
| Overall Quality (OQ) | 7.8 |

EXAMPLE 2

Chicken soup mix was prepared as detailed in Example 1. The data is presented in Table 2. The yield of soup mix (in dehydrated form) was 40.2%. It contained 49.2% protein and 24.3% fat. The product showed microbial (per gram except coliforms) as follows: Total plate count $1.40 \times 10^4$, spore count $1.18 \times 10^4$, S. aureus—nil, Coliforms (MPN/g) 4.6 and yeast and moulds $3.3 \times 10^2$. Microbial profiles were within the permissible limits. Product was safe microbiologically. Sensory profile revealed that the product was within acceptable range.

TABLE 2

Yield, proximate composition, salt content, microbial and sensory profiles of dry soup mix

| | % |
|---|---|
| Yield | 40.2 |
| Moisture | 5.2 |
| Protein | 49.2 |
| Fat | 24.3 |
| Ash | 14.8 |
| Salt | 9.8 |
| Microbial load (count/g) | |
| Total plate count | $1.40 \times 10^5$ |
| Spore count | $1.18 \times 10^4$ |
| S. aureus | Nil |
| Yeast and mould count | $3.3 \times 10^2$ |
| Coliforms (MPN/g) | 4.6 |
| Sensory profile Score | |
| Color | 8.4 |
| Consistency | 7.2 |
| Flavour | 7.4 |
| Taste | 8.0 |
| Overall Quality (OQ) | 7.8 |

EXAMPLE 3

Chicken soup mix was prepared as detailed in Example 1. The data on yield, proximate composition, microbial and sensory profile is presented in Table 3. The yield of soup mix (dehydrated) was 43.5%. The product contained 43.83% protein and 20.80 fat. Microbial counts (per gram) is as follows: Total plate count $5.6 \times 10^3$, spore count $2.7 \times 10^2$, S. aureus—nil, and yeast and mould count $3.9 \times 10^2$ and coliforms (MPN/g) 0.43 and the data shows that microbial profiles are within the standard limits. Product was safe microbiologically. Sensory profile indicated that the product was acceptable.

TABLE 3

Yield, proximate composition, salt content, microbial load and sensory profiles of dry soup mix

| | % |
|---|---|
| Yield | 43.5 |
| Moisture | 4.9 |
| Protein | 43.83 |
| Fat | 20.86 |
| Ash | 14.4 |
| Salt | 9.6 |
| Microbial load (count/g) | |
| Total plate count | $5.6 \times 10^3$ |
| Spore count | $2.7 \times 10^2$ |
| S. aureus | Nil |
| Yeast and mould count | $3.9 \times 10^2$ |
| Coliforms (MPN/g) | 0.43 |
| Sensory profile Score | |
| Color | 7.8 |
| Consistency | 8.0 |
| Flavour | 8.0 |
| Taste | 7.8 |
| Overall Quality (OQ) | 7.8 |

EXAMPLE 4

Chicken soup mix was prepared as detailed in Example 1. The data on yield, proximate composition, salt content, microbial and sensory profile is presented in Table 4. The yield of soup mix (dehydrated form) is 42.8%. The product showed a protein content of 37.72% and fat content of 23.45%. With regard to microbial profile, the product showed total plate count of $6.4 \times 10^4$; spore count $3.9 \times 10^3$ S. aureus—nil, yeast and mould count $3.1 \times 10^2$, coliforms (MPN/g) 0.58. The product was microbiologically safe. The product was found to be acceptable from the point of sensory profile.

TABLE 4

Yield, proximate composition, salt content, microbial load and sensory profiles of dry soup mix

| | % |
|---|---|
| Yield | 42.8 |
| Moisture | 4.90 |
| Protein | 37.72 |
| Fat | 23.40 |
| Ash | 12.54 |
| Salt | 9.4 |
| Microbial load (per gram) | |
| Total plate count | $6.4 \times 10^4$ |
| Spore count | $3.9 \times 10^3$ |
| S. aureus | Nil |
| Yeast and mould count | $3.1 \times 10^2$ |
| Coliforms (MPN/g) | 0.58 |
| Sensory profile Score | |
| Color | 7.6 |
| Consistency | 7.8 |
| Flavour | 8.0 |
| Taste | 7.8 |
| Overall Quality (OQ) | 7.8 |

The main advantages of the present invention are:

a) The process resulted in a standardized technique for the preparation of chicken soup mix.

b) The process resulted in the development of chicken soup mix in dehydrated form, which improved the body of the prepared soup.

c) The binding of starch and chicken solids results in the prevention of settling of solids in the prepared soup.

c). The process resulted in the development of chicken soup mix in dehydrated form and storable at ambient temperature.

d) The process resulted in the development of soup mix rich in protein.

e) The product is low in microbial counts and hence the product is microbiologically safe.

While this invention has been described as having preferred sequences, ranges, steps, materials, or designs, it is understood that it includes further modifications, variations, uses and/or adaptations thereof following in general the principle of the invention, and including such departures from the present disclosure as those come within the known or customary practice in the art to which the invention pertains, and as may be applied to the central features hereinbeforesetforth, and fall within the scope of the invention and of the limits of the appended claims.

We claim:

1. A process for the preparation of ready to use chicken soup mix, said process comprising the steps of:
   (i) Obtaining 72.0-76.0% by weight of chicken pieces with bone;
   (ii) cooking the chicken pieces of step (i) along with 1.75-2.0% by weight of chopped ginger, 1.75 to 2.0% by weight of garlic and 3.0-6.0% by weight of onion in water for a time period in the range of 30-45 min;
   (iii) separating and collecting the extract from the cooked mass;
   (iv) removing the bones from cooked mass to obtain a meat mixture containing deboned meat, cooked ginger, garlic and onion;
   (v) mincing the meat mixture of step (iv);
   (vi) adding the extract obtained in step (iii) and 8.0-11.0% by weight of starch to the minced meat mixture of step (v) and mixing them to obtain a slurry;
   (vii) grinding the slurry of step (vi);
   (viii) drying the ground slurry of step (vii) to obtain a dried mass;
   (ix) powdering the dried mass of step (viii) and mixing the same with 3.0-5.0% by weight of milk powder, 3.0-4.0% by weight of salt, 0.02-0.05% by weight of MSG, 0.15-0.25% by weight of ascorbic acid, 0.30-0.40% by weight of pepper powder and 0.20-0.50% by weight of sugar to get the soup mix.

2. A process as claimed in claim 1 wherein in step (i), the chicken used is a dressed chicken.

3. A process as claimed in claim 1 wherein in step (i), the dressed chicken is cut into 10-12 pieces per bird.

4. A process as claimed in claim 1 wherein in step (ii), 8-10 ltrs of water is used for cooking.

5. A process as claimed in claim 1 wherein in step (ii), the cooking is done at 15 psi.

6. A process as claimed in claim 1 wherein in step (iii), the extract is separated from the cooked mass by draining.

7. A process as claimed in claim 1 wherein in step (v), mincing is done manually or by using a mincing means.

8. A process as claimed in claim 1 wherein in step (vi), the starch used is corn starch.

9. A process as claimed in claim 1 wherein in step (vi), the mixing is done manually or using a mixing means.

10. A process as claimed in claim 1 wherein in step (vii), the grinding is carried out by passing the slurry through a fryma mill for one or more times.

11. A process as claimed in claim 10, wherein the grinding is carried out by passing the slurry through a fryma mill for 2-3 times.

12. A process as claimed in claim 1 wherein in step (viii), the slurry is dried in a tray drier.

13. A process as claimed in claim 12 wherein the slurry is dried at 50-60° C. for a time period of 4-5 hours.

14. A process as claimed in claim 1 wherein in step (ix), the dried mass is powdered using a pulverizer.

15. A process as claimed in claim 1 wherein in step (ix), the mixing is done manually or using a mixer.

* * * * *